US012693453B2

(12) United States Patent
Schmidt et al.

(10) Patent No.: US 12,693,453 B2
(45) Date of Patent: Jul. 28, 2026

(54) OPTICAL CONSTRUCTIONS WITH ANGULAR LIGHT CONTROL FILMS

(71) Applicant: 3M INNOVATIVE PROPERTIES COMPANY, St. Paul, MN (US)

(72) Inventors: Daniel J. Schmidt, Woodbury, MN (US); Kevin W. Gotrik, Hudson, WI (US); Kundapur Raveesh Shenoy, Woodbury, MN (US); Przemyslaw P. Markowicz, Woodbury, MN (US); Zhaohui Yang, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 160 days.

(21) Appl. No.: 18/571,846

(22) PCT Filed: Jun. 17, 2022

(86) PCT No.: PCT/IB2022/055657
§ 371 (c)(1),
(2) Date: Dec. 19, 2023

(87) PCT Pub. No.: WO2022/269438
PCT Pub. Date: Dec. 29, 2022

(65) Prior Publication Data
US 2024/0230961 A1      Jul. 11, 2024

Related U.S. Application Data

(60) Provisional application No. 63/202,750, filed on Jun. 23, 2021.

(51) Int. Cl.
*G02B 3/00*      (2006.01)
*G02B 5/00*      (2006.01)

(52) U.S. Cl.
CPC ........... *G02B 3/0056* (2013.01); *G02B 5/003* (2013.01)

(58) Field of Classification Search
CPC ..... G02B 3/0037; G02B 3/0056; G02B 5/003
See application file for complete search history.

(56) References Cited

U.S. PATENT DOCUMENTS 3,524,789 A      8/1970   Olsen
5,254,388 A      10/1993  Melby et al.
(Continued)

FOREIGN PATENT DOCUMENTS

JP      2005128352 A      5/2005
JP      2006091164 A      4/2006
(Continued)

OTHER PUBLICATIONS

International Search Report for PCT International Application No. PCT/IB2022/055657, mailed on Aug. 23, 2022, 4 pages.
(Continued)

*Primary Examiner* — Kevin K Pyo

(57) ABSTRACT

An optical construction includes a lens film having a structured first major surface having a plurality of microlenses and an opposing second major surface. A light absorbing layer is disposed on the second major surface and has an average thickness of greater than about 0.5 microns and an optical density of greater than about 3. A plurality of openings are provided in the light absorbing layer. A major surface of the light absorbing layer includes a plurality of irregular features imparting an average mean square height Sq of greater than about 0.05 microns. In a cross-section, the opening includes opposing first and second sidewalls having respective first and second best linear fits with respective r-squared values R1 and R2 and respective linear slope
(Continued)

magnitudes S1 and S2, each of R1 and R2 greater than about 0.8. S1 and S2 within 30% of each other.

7 Claims, 8 Drawing Sheets

(56)        References Cited

U.S. PATENT DOCUMENTS

| | | | |
|---|---|---|---|
| 6,398,370 | B1 | 6/2002 | Chiu et al. |
| 6,633,351 | B2 | 10/2003 | Hira et al. |
| 7,467,873 | B2 | 12/2008 | Clarke et al. |
| 7,679,828 | B2 | 3/2010 | Munro |
| 7,706,073 | B2 | 4/2010 | Munro |
| 8,012,567 | B2 | 9/2011 | Gaides et al. |
| 8,234,998 | B2 | 8/2012 | Krogman et al. |
| 9,360,591 | B2 | 6/2016 | Hunt et al. |
| 9,393,589 | B2 | 7/2016 | Olmeijer et al. |
| 9,453,949 | B2 | 9/2016 | Nand et al. |
| 12,105,302 | B2 * | 10/2024 | Gillette ............... G02B 3/0056 |
| 2007/0258149 | A1 | 11/2007 | Gardner et al. |
| 2009/0067055 | A1 | 3/2009 | Yamamura |
| 2018/0149907 | A1 | 5/2018 | Gahagan et al. |
| 2022/0373387 | A1 * | 11/2022 | Lu .......................... G02B 1/115 |

FOREIGN PATENT DOCUMENTS

| | | | |
|---|---|---|---|
| JP | 2006253332 | A | 9/2006 |
| JP | 2010013435 | A | 1/2010 |
| JP | 2010015070 | A | 1/2010 |
| JP | 2010068055 | A | 3/2010 |
| JP | 2010091864 | A | 4/2010 |
| JP | 2011170043 | A | 9/2011 |
| JP | 2022103081 | A | 7/2022 |
| WO | 2019118686 | A1 | 6/2019 |
| WO | 2020026139 | A1 | 2/2020 |
| WO | 2020035768 | A1 | 2/2020 |
| WO | 2020250090 | A1 | 12/2020 |
| WO | 2020250180 | A1 | 12/2020 |
| WO | 2021111297 | A1 | 6/2021 |
| WO | 2021205248 | A1 | 10/2021 |
| WO | 2021255596 | A1 | 12/2021 |
| WO | 2022058815 | A1 | 3/2022 |
| WO | 2022130082 | A1 | 6/2022 |
| WO | 2022130084 | A1 | 6/2022 |
| WO | 2022130218 | A1 | 6/2022 |

OTHER PUBLICATIONS

Krogman, "Automated Process for Improved Uniformity and Versatility of Layer-by-Layer Deposition", Langmuir, 2007, vol. 23, No. 6, pp. 3137-3141.
Rydzek, "Strategies for covalently reticulated polymer multilayers", Soft Matter, 2012, vol. 8, No. 38, pp. 9738-9755.

* cited by examiner

OPTICAL CONSTRUCTIONS WITH ANGULAR LIGHT CONTROL FILMS

CROSS REFERENCE TO RELATED APPLICATIONS

This application is a national stage filing under 35 U.S.C. 371 of PCT/IB2022/055657, filed Jun. 17, 2022, which claims the benefit of U.S. Provisional Application No. 63/202,750, filed Jun. 23, 2021, the disclosures of which are incorporated by reference in their entireties herein.

TECHNICAL FIELD

The present disclosure generally relates to angular light control films and methods of making angular light control films.

BACKGROUND

Angular light control, or light collimation, is relevant to several application areas including general optics, photography, microscopy, spectrometry, astronomy, fiber optics/telecommunications, laser light control, displays, optical sensors, solar shingles, privacy filters, and automotive light control films, on-display fingerprint sensing and biometrics, as some examples. A number of leading smartphone brands are exploring full-screen fingerprint sensing to simplify device access and enhance security. The enabling technologies include optical sensors embedded in displays in combination with requisite light control to obtain a fingerprint image of sufficient resolution.

SUMMARY

Some aspects of the disclosure relate to an optical construction including a lens film having an outermost structured first major surface and an opposing outermost second major surface. The structured first major surface includes a plurality of microlenses arranged along orthogonal first and second directions. A light absorbing layer is disposed on the second, opposite the first, major surface of the lens film and has an average thickness of greater than about 0.5 microns and an optical density of greater than about 3 for at least one visible wavelength in a visible wavelength range extending from about 420 nm to about 680 nm. The light absorbing layer defines a plurality of through physical openings therein extending between opposite third and fourth major surfaces of the light absorbing layer. At least one of the third and fourth major surfaces includes a plurality of irregular features imparting an average mean square height Sq of greater than about 0.05 microns to the major surface. In a cross-section of at least one of the through physical openings in a direction substantially parallel to a thickness direction of the light absorbing layer, the through opening includes opposing substantially parallel substantially straight first and second sidewalls having respective first and second best linear fits with respective r-squared values R1 and R2 and respective linear slope magnitudes S1 and S2. Each of R1 and R2 is greater than about 0.8, and S1 and S2 are within 30% of each other.

Another aspect of the disclosure relates to an optical construction including a light absorbing layer having an average thickness of greater than about 1.5 microns, a plurality of light absorbing particles at a weight loading of greater than about 70%, and an optical density of greater than about 3 for at least one visible wavelength in a visible wavelength range extending from about 420 nm to about 680 nm. The light absorbing layer defines a plurality of through physical openings therein extending between opposite major top and bottom surfaces of the light absorbing layer. At least one of the major top and bottom surfaces includes a plurality of irregular features imparting an average mean square height Sq of greater than about 0.05 microns and an average height Sa of greater than about 0.7 microns to the major surface. In a cross-section of at least one of the through physical openings in a direction substantially parallel to a thickness direction of the light absorbing layer, the through opening includes opposing first and second sidewalls having respective first and second best linear fits with respective r-squared values R1 and R2 and respective linear slope magnitudes S1 and S2. Each of R1 and R2 is greater than about 0.8 and each of S1 and S2 is greater than about 4.

Another aspect of the disclosure relates to a method of making an optical construction including providing a lens film having a structured first major surface and an opposing second major surface. The structured first major surface includes an array of microlenses. A plurality of coatings are provided by alternatingly coating on a third major surface, a plurality of aqueous dispersions of a first polymeric material and a plurality of aqueous dispersions of a light absorbing second material. The plurality of coatings on the third major surface are dried resulting in a light absorbing layer having an average thickness of greater than about 0.5 microns and an optical density of greater than about 3. A plurality of through physical openings are formed in the light absorbing layer extending between opposite major surfaces of the light absorbing layer.

Other aspects of the disclosure relate to an optical system configured to sense a presence of a finger of a user of the optical system. The optical system includes the optical construction of according to one or more aspects of the disclosure. A display is configured to display an image for viewing by the user and disposed on the outermost structured first major surface side of the lens film. An optical sensor is configured to detect light reflected by the finger of the user and disposed on the light absorbing side of the optical construction.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where, FIG. 1 schematically shows an optical system having an optical construction in accordance with some embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Figure 1:
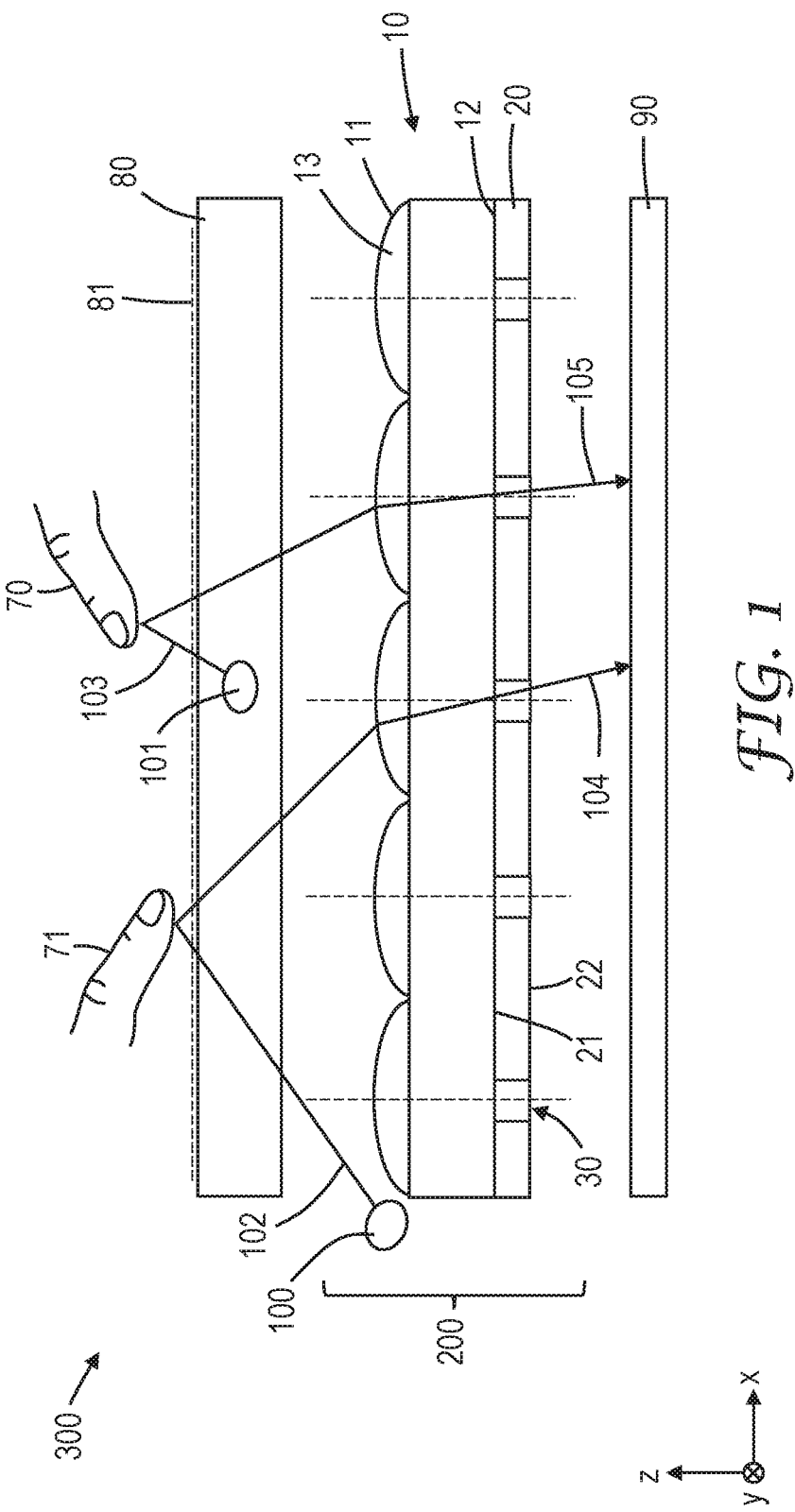

In the following detailed description, reference is made to the accompanying drawings that form a part hereof, and in which are shown by way of illustration several specific embodiments. It is to be understood that other embodiments are contemplated and may be made without departing from the scope or spirit of the present disclosure.

Angular light control is commonly achieved with either microprisms, micro-louvers, or pinhole array structures. Pinhole arrays, also called pinhole apertures, are usually made by either mechanical punching or laser drilling. One common challenge is large-scale roll-to-roll manufacturing of precise pinhole arrays.

The embodiments disclosed herein addresses problems of providing thin (e.g., less than 3 microns) light blocking layers with high optical density and lower reflections than metals. These features may improve laser ablation characteristics and reduce undesired cross-talk. The light-blocking coatings disclosed herein are made through layer-by-layer (LbL) assembly of multiple bi-layers comprising oppositely charged materials, typically, a positively charged (i.e., cationic) polymer and negatively charged (i.e., anionic) light absorbing material, for instance, carbon black nano-pigment. The optical constants (i.e., refractive index and extinction coefficient) and the morphology (e.g., porosity) of the coatings can be altered depending on the specific materials of choice. Typical cationic polymers include soluble polyelectrolytes such as polydiallyldimethylammonium chloride, polyethylenimine, or polyallylamine, or, alternatively, cationic polymer suspensions such as polyurethane dispersions or acrylic emulsions. In some cases, at least a portion of the cation layers, anion layers, or a combination may include a light absorbing material (e.g. pigment) ionically bonded to the polyelectrolyte. It should be appreciated that individual bi-layers in the final article may not be distinguishable from each other by common methods in the art such as scanning electron microscopy (SEM) or transmission electron microscopy (TEM). Typical anionic, surface modified carbon black pigments are available from Cabot Corporation under the trade names CAB-O-JET 200, 300, 352K, and 400. It is also within scope of the disclosure to layer a positively charged light-absorbing material with a negatively charged polymer (e.g. non-light absorbing material) or with a negatively charged light-absorbing material.

Some aspects of the disclosure describe a pinhole array angular light control film with a microlens array on a first major surface and one or more light-blocking layers on a second major surface of the light control film. The light-blocking layer(s) may include layer-by-layer assembled coatings having surface-modified, anionic carbon black nanoparticles and polymers including cationic functional groups. The carbon black coatings are highly loaded (e.g. >30 wt %, or >60 wt %, or >80 wt % carbon black) and possess high optical density (OD) in very thin layers. For example, OD of >1, or >2, or >3 (at wavelength of 550 nm) at thicknesses less than 400 nm, 700 nm, and 1000 nm, respectively. Typical extinction coefficients, k, for the light blocking layers are between 0.2 and 0.4 at a wavelength of 550 nm. An optional, substantially transmissive, spacer layer, with thickness from 1 to 10 microns, may be disposed between the two light-blocking layers.

An optical system (300) including an optical construction (200) according to some embodiments of the disclosure is shown in FIG. 1. The optical system (300), in some embodiments, may be configured to sense a presence of a finger (70, 71) of a user of the optical system (300).

Figure 2A:
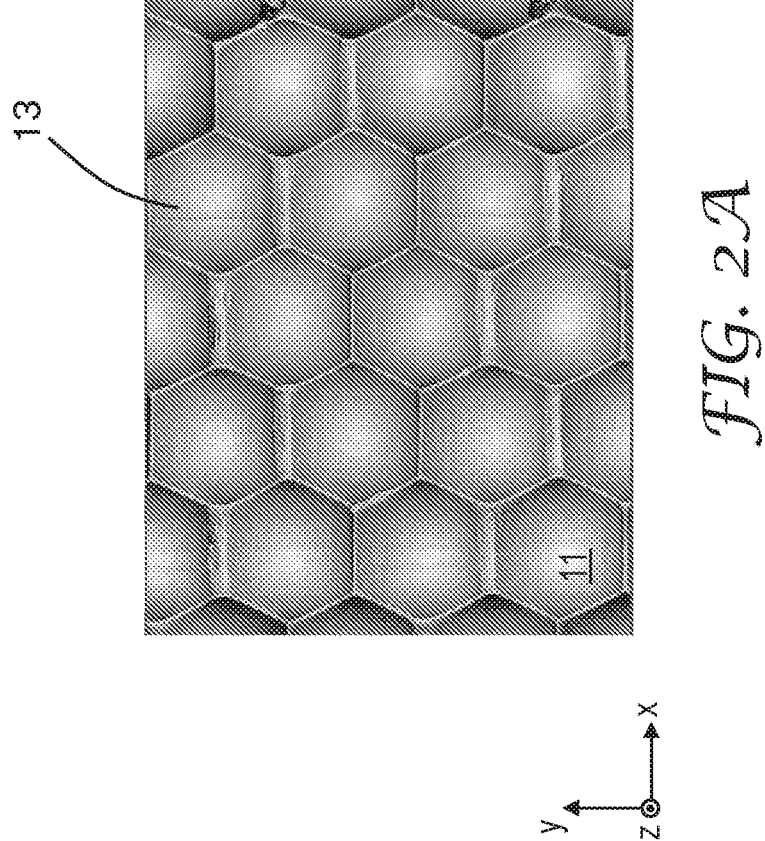
FIGS. 2A and 2B show the top down view and the cross-section SEM images, respectively, of the microlenslet structures on PET substrate.

The optical construction (200) in some aspects includes a lens film (10) having an outermost structured first major surface (11) and an outermost second major surface (12) disposed opposite the structured first major surface (11). The structured first major surface (11) may include a plurality of microlenses (13). The plurality of microlenses (13) may be arranged as an array of microlenses along orthogonal first (x-axis) and second (y-axis) directions as shown in FIG. 2A.

A microlens is a lens having at least one lateral dimension (e.g., diameter) less than 1 mm. In some embodiments, the average diameter of the microlenses (13) may be in a range of 5 micrometers to 1000 micrometers. In some embodiments, the microlenses (13) may be curved about the orthogonal first (x-axis) and second (y-axis) directions. In other embodiments, the microlenses (13) may be lenticular microlenses. In some instances, the array of microlenses, can have one or more of different sizes, shapes, indices of refraction, and focal lengths. For instance, the array can be regular (e.g., square or hexagonal lattice) or irregular (e.g., random or pseudorandom). In some instances, the microlenses (13) may have substantially equal focal lengths. The microlenses used in any of the embodiments described herein can be any suitable type of microlenses. In some embodiments, an array of microlenses may include at least one of refractive lenses, diffractive lenses, metalenses (e.g., surface using nanostructures to focus light), Fresnel lenses, symmetric lenses (e.g., rotationally symmetric about an optical axis), asymmetric lenses (e.g., not rotationally symmetric about an optical axis), or combinations thereof. In some instances, at least some of the microlenses may be spherical microlenses. In other instances, at least some of the microlenses may be aspherical microlenses.

The optical construction (200) includes a light absorbing layer (20) disposed on the second major surface (12) of the lens film (10). The average thickness of the light absorbing layer (20) may be greater than about 0.5 microns. In some instances, the average thickness of the light absorbing layer (20) may be about 0.75 microns, or about 1.0 microns, or about 1.25 microns. In some other instances, the average thickness of the light absorbing layer (20) may be greater than about 1.5 microns, or about 1.75 microns, or about 2 microns, or about 2.5 microns, or greater than about 3 microns. The optical density of the light absorbing layer (20) may be greater than about 3 for at least one visible wavelength in a visible wavelength range extending from about 420 nm to about 680 nm. In some instances, the optical density of the light absorbing layer (20) may be about 3.5, or 4, or 4.5, or 5, or 5.5, or 6, or 7. In some aspects, the at least one visible wavelength may include a blue, a green or a red wavelength.

The optical system (300) as shown in the embodiment illustrated in FIG. 1 may include a display (80) configured to display an image (81) for viewing by the user. The display

(80) may be disposed on the outermost structured first major surface side (11) of the lens film. The optical system may include an optical sensor (90) configured to detect light (104, 105) reflected by the finger (70, 71) of the user. The optical sensor (90) may be disposed on the light absorbing side (20) of the optical construction (200). A light source (100, 101) may be configured to emit light (102, 103), the emitted light being reflected (104, 105) by the finger (70, 71) of the user, and the reflected light (104, 105) being detected by the optical sensor (90). In some cases, the light source (100) may be disposed on a lateral side of the optical construction (200). In some other cases, the light source (101) may be disposed inside the display (80).

In some aspects, the light absorbing layer (20) may define a plurality of through physical openings (30), or pinholes, therein extending between opposite third (21) and fourth (22) major surfaces of the light absorbing layer (20). In some instances, the opposite third and fourth major surfaces (21, 22) may be opposite top and bottom surfaces of the light absorbing layer (20). The through physical openings (30) formed in any of the embodiments described herein can have any suitable shape. In some embodiments, the through physical openings (30) may include at least one of elliptical pinholes, circular pinholes, rectangular pinholes, square pinholes, triangular pinholes, and irregular pinholes. In some cases, the through physical openings (30) may include any combinations of these pinhole shapes.

The through physical openings (30) in the light absorbing layer (20) may be formed by laser ablation through the microlenses (13), for example. Suitable lasers may include fiber lasers such as a 40 W pulsed fiber laser operating a wavelength of 1070 nm, for example. Creating openings in a layer using a laser through a microlens array is generally described in US2007/0258149 (Gardner et al.), for example. An absorption overcoat can optionally be applied to the optical construction (200) to increase the absorption of energy from the laser. In some embodiments, the light absorbing layer (20) disposed on the second major surface (12) of the lens film (10) may include a UV-cured polymer material and the plurality of laser ablated through physical openings (30) may be formed therein. It may be desirable that the UV-cured polymer material has sufficiently high absorption of the laser to be ablated to form the openings. After ablation, it may be desirable that the light absorbing layer (20) including the UV-cured polymer material blocks visible light to a sufficiently high degree to meet the light blocking metrics (FWHM, cross talk etc.).

In some embodiments, the light absorbing layer (20) may include a plurality of light absorbing particles at a weight loading of greater than about 60%, or greater than about 65%, or greater than about 70%, or greater than about 75%, or greater than about 80%. In some aspects, the light absorbing particles may include a light absorbing pigment, or a light absorbing dye, or a carbon black, or combinations thereof. For example, the first light absorbing layer (20) may include carbon black, which absorbs visible light and infrared light of the laser. For instance, various carbon black loadings may be used to strike a balance between ablation/absorption properties and processability. A roll-to-roll coating process may be used to coat the carbon black-loaded material on the lens layer. UV lights (Fusion D lamps) may be employed to cure the coating. In other embodiments, the light absorbing layer (20) may have a black or a dark gray color.

Figure 3:
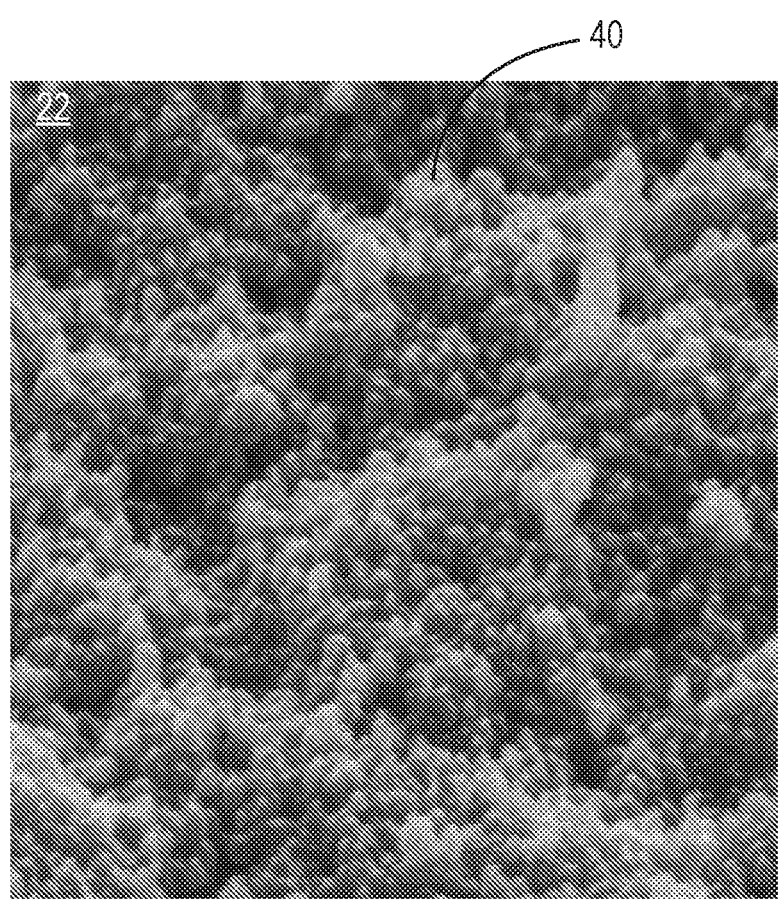
FIG. 3-4 show microscopic images of a bottom surface of a light absorbing layer of an optical construction in accordance with some embodiments.
Figure 4:
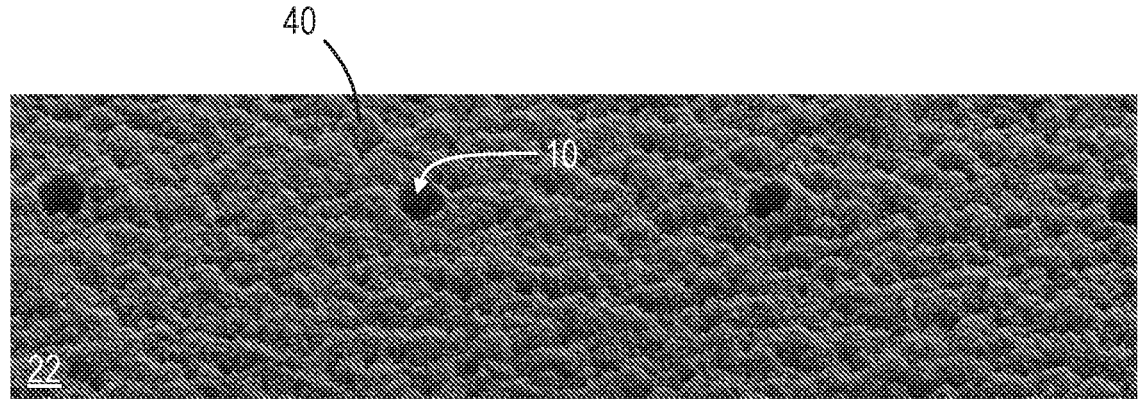
Figure 5:
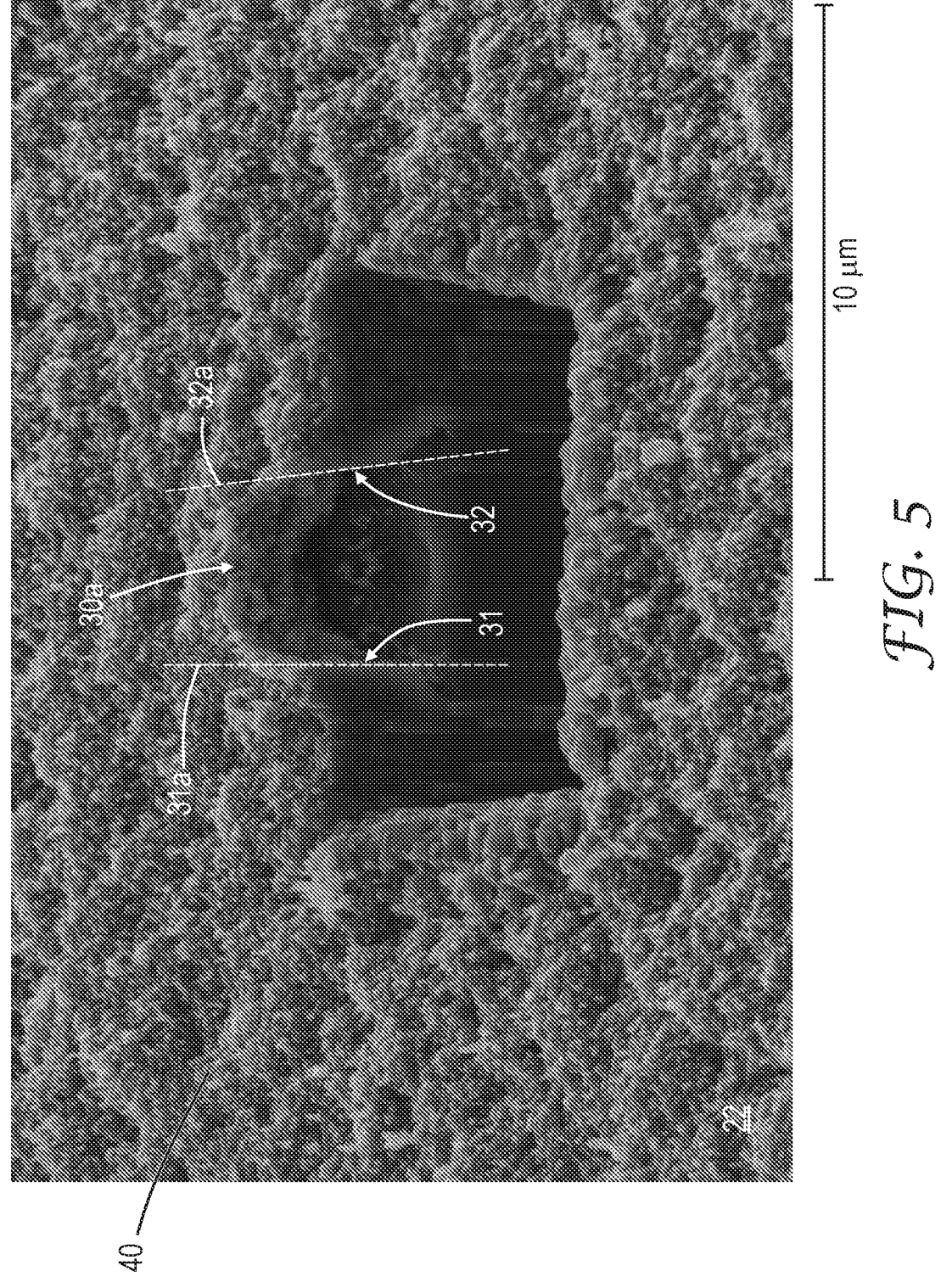
FIG. 5 shows a microscopic image of an opening formed in a light absorbing layer of an optical construction in accordance with some embodiments.

As shown in FIGS. 3-5, at least one of the third (21) and fourth (22) major surfaces of the light absorbing layer (20) may include a plurality of irregular features (40). The irregular features (40) may impart an average mean square height Sq of greater than about 0.05 microns, or greater than 0.075 microns, or greater than 0.1 microns to the major surface. In some aspects, a maximum height Sz of the irregular features may be greater than about 0.7 microns, or greater than 0.75 microns, or greater than 0.8 microns, or greater than 0.85 microns to the major surface.

FIG. 5 shows a cross-section (xy-plane) of at least one of the through physical openings (30a) in a direction (z-axis) substantially parallel to a thickness direction (z-axis) of the light absorbing layer (20). As shown in FIG. 5, the at least one of the through openings (30a) includes opposing first (31) and second (32) sidewalls. In some aspects, the first and second sidewalls (31, 32) may be substantially straight and substantially parallel to each other. The first (31) and second (32) sidewalls may be substantially parallel to the thickness direction (z-axis) of the light absorbing layer (20). The first (31) and second (32) sidewalls may have respective first (31a) and second (32a) best linear fits with respective r-squared values R1 and R2 and respective linear slope magnitudes S1 and S2. In some aspects, each of the r-squared values R1 and R2 may be greater than about 0.8 or greater than about 0.85, or greater than about 0.9, or greater than about 0.95, and the linear slope magnitudes S1 and S2 may be within 30% of each other. In some instances, S1 and S2 may be within 25%, or 20%, or 15%, or 10% of each other. In other instances, each of S1 and S2 may be greater than about 4, or greater than 6, or greater than 8, or greater than 10.

Figure 6:
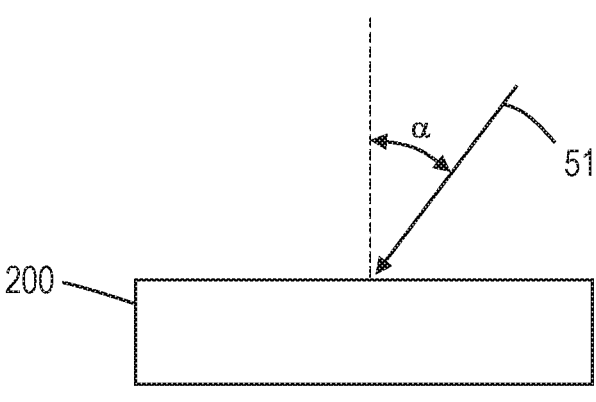
FIG. 6 schematically shows incident light incident on an optical construction at an incident angle according to some aspects.
Figure 7:
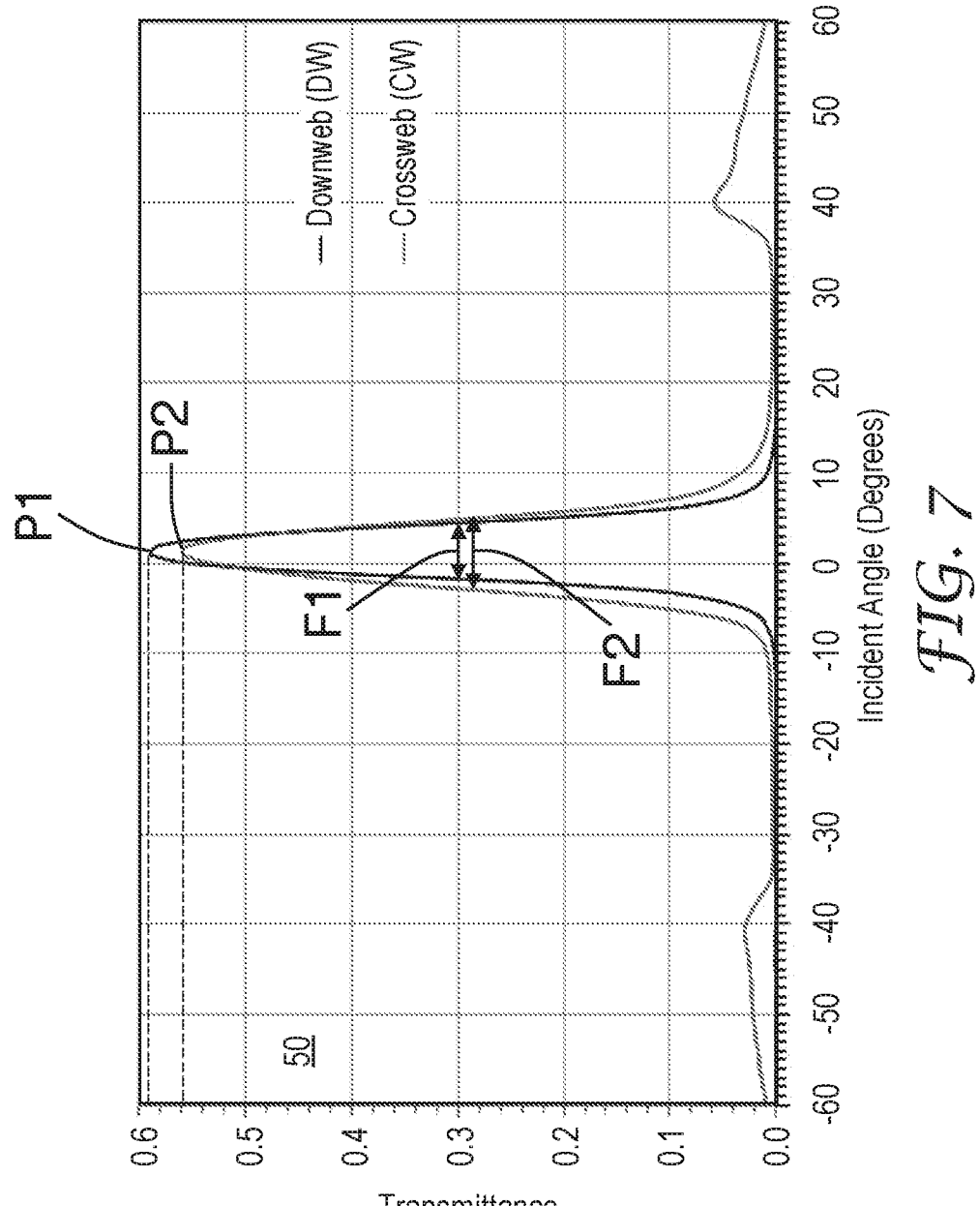
FIG. 7 graphically represents the angular light transmission profile of an optical construction as a function of incident angle according to some aspects of the disclosure.

FIG. 7, shows an optical transmittance (50) of two different optical constructions (200) according to one or more embodiments of this disclosure as a function of an incident angle ($\alpha$) for a substantially collimated incident light (51) as illustrated in FIG. 6. The optical transmittance (50) includes a global transmittance peak (P1, P2) greater than about 40%, or greater than about 45%, or greater than about 50%, or greater than about 55%. A corresponding full width at half maximum (FWHM) (F1, F2) may be less than about 30 degrees or less than about 25 degrees, or less than about 20 degrees, or less than about 15 degrees, or less than about 10 degrees.

Figure 8:
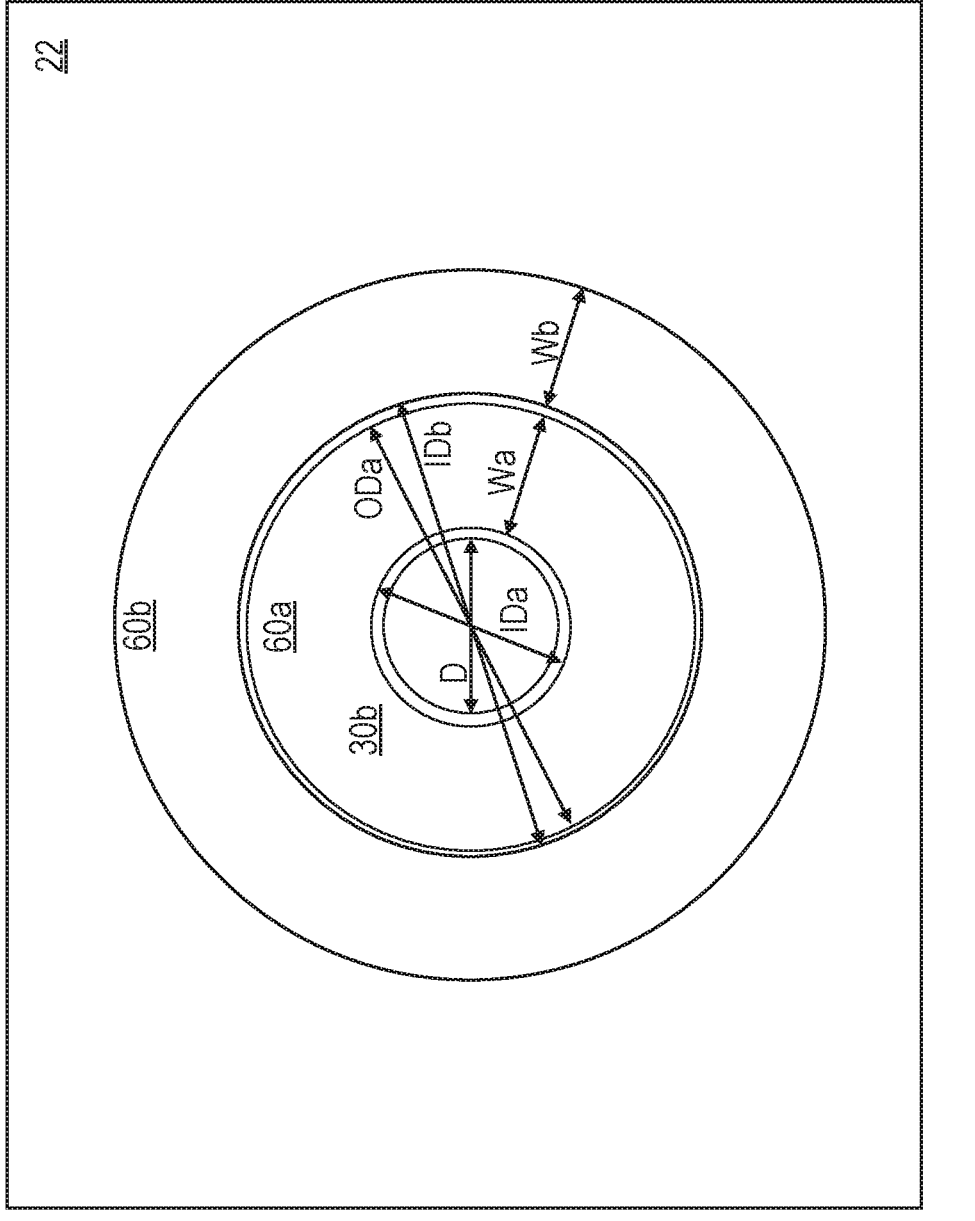
FIG. 8 schematically shows the geometrical construction of a major surface of the light absorbing layer including an opening.

FIG. 8 schematically shows one of the major surfaces (22) of the light absorbing layer (20). For each of at least some of the through physical openings (30b) in the plurality of through physical openings, the major surface (22) that includes the plurality of irregular features (40) may define inner (60a) and outer (60b) concentric annular regions. The inner and outer concentric annular regions (60a, 60b) may be concentric with the through physical opening (30b) and have annular widths (Wa, Wb). The annular widths (Wa, Wb) may be within about 20% of a diameter (D) of the through physical opening (30b). In some cases, the annular widths (Wa, Wb) may be within 15%, or within 10%, or within 5% of the diameter (D) of the through physical opening (30b).

In some aspects, an inner diameter (IDa) of the inner annular region (60a) may be between about 0.1% to about 2% greater than the diameter (D) of the through physical opening (30b). An inner diameter (IDb) of the outer annular region (60b) may be between about 0.1% to about 2% greater than an outer diameter (ODa) of the inner annular region (60a).

In some aspects, the at least one of the major surfaces (22) that includes the plurality of irregular features (40) may have an average mean square heights Sq1 and Sq2 in the respective inner (60a) and outer (60b) annular region. In some cases, Sq1−Sq2≤70 nm, or ≤60 nm, or ≤50 nm, or ≤40 nm, or ≤30 nm, or ≤20 nm, or ≤10 nm.

In some aspects, the at least one of the major surface (22) that includes the plurality of irregular features (40) may have arithmetical mean heights Sa1 and Sa2 in the respective inner (60a) and outer (60b) annular region. In some cases, Sa1−Sa2≤50 nm, or ≤40 nm, or ≤30 nm, or ≤20 nm, or ≤10 nm.

According to some embodiments, the light absorbing layer (20) disclosed herein are made through layer-by-layer (LbL) assembly process. The LbL process is a coating method utilizing sequential, self-limiting adsorption of materials with complementary functional groups. The LbL process is commonly used to assemble films or coatings of oppositely charged polyelectrolytes electrostatically, but other functionalities such as hydrogen bond donor/acceptors, metal ions/ligands, and covalent bonding moieties can be the driving force for film assembly. "Polyelectrolyte" means a polymer or compound or particle with multiple ionic groups capable of electrostatic interaction. In some embodiments, the polyelectrolyte may be prepared and applied to a surface as an aqueous solution. In some aspects, a third major surface (12) of the lens film (10), which may be substantially coincident with the second major surface (12), may be alternatingly coated with a plurality of aqueous dispersions of a first polymeric material and a plurality of aqueous dispersions of a light absorbing second material to obtain a plurality of coatings through the LbL process.

The term "aqueous" means that the liquid of the coating contains at least 80% by weight of water. In some embodiments, each of the aqueous dispersions in the plurality of aqueous dispersions of the first polymeric material may include at least 80% water by weight, or, in some instances, at least 85%, or 90%, or 95%, or 97%, or 99% water by weight. Each of the aqueous dispersions in the plurality of aqueous dispersions of the light absorbing second material may include at least 80% water by weight, or, in some cases, at least 85%, or 90%, or 95%, or 97%, or 99% water by weight.

In some aspects, the plurality of aqueous dispersions of the first polymeric material may be oppositely charged to the plurality of aqueous dispersions of the light absorbing second material. For instance, one of the first polymeric material and the light absorbing second material may include a plurality of positively charged ionic groups and the other of the first polymeric material and the light absorbing second material may include a plurality of negatively charged ionic groups.

Suitable polymers that include a plurality of positively charged ionic (or ionizable) groups (i.e., polycationic polymers) can be derived from these monomers, for example:

Primary amino-containing monomers and their hydrochloride salts: vinyl amine, allyl amine, aminoalkyl (meth)acrylamide, aminoalkyl (meth)acrylate, 2-N-morpholinoalkyl (meth)acrylate, Secondary amino-containing monomers Tertiary amino-containing monomers: various N,N-dialkylaminoalkyl (meth)acrylates and N,N-dialkylaminoalkyl (meth)acrylamides such as N,N-dimethyl aminoethyl (meth)acrylate, N,N-dimethylaminoethyl (meth) acrylamide, N,N-dimethylaminopropyl (meth)acrylate, N,N-dimethylaminopropyl (meth)acrylamide, N,N-diethylaminoethyl (meth)acrylate, N,N-diethylaminoethyl (meth)acrylate, N,N-diethylaminopropyl (meth)acrylate, and N,N-diethylaminopropyl (meth) acrylamide, (tert-Butylamino)alkyl methacrylate, (tert-Butylamino)alkyl methacrylamide Quaternary amino-containing monomers: methacryloylaminopropyl trimethylammonium chloride, diallyldimethylammonium chloride, 2-acryloxyalkyltrimethylammonium chloride Some of the more common polycationic polymers used for layer-by-layer coating are: linear and branched poly (ethylenimine) (PEI), poly(allylamine hydrochloride), polyvinylamine, chitosan, polyaniline, polyamidoamine, poly (vinylbenzyltriamethylamine), polydiallyldimethylammonium chloride (PDAC), poly(dimethylaminoethyl methacrylate), poly(methacryloylamino) propyl-trimethylammonium chloride, and combinations thereof including copolymers thereof.

Suitable polycations may also include polymer latexes, dispersions, or emulsions with positively charged functional groups on the surface. Examples include Sancure 20051 and Sancure 20072 cationic polyurethane dispersions available from Lubrizol Corporation (Wickliffe, Ohio). Suitable polycations may also include inorganic nanoparticles (for example, aluminum oxide, zirconium oxide, titanium dioxide) suitably below their native isoelectric point, or alternatively surface-modified with positively charged functional groups.

Suitable polymers that include negatively charged ionic (or ionizable) groups (i.e., polyanionic polymers) can be derived from these monomers, for example: Acid monomers: (meth)acrylic acid, β-carboxyethyl (meth)acylate, 2-(meth)acrylolyoxyethyl phthalic acid, 2-(meth)acryloyloxy succinic acid, vinyl phosphonic acid, vinyl sulfonic acid, styrene sulfonic acid, and 2-acrylamido-2-methylpropane sulfonic acid, (meth)acrylate salts (i.e., zinc acrylate, zirconium acrylate, etc.), carboxy ethyl (meth)acrylate salts (i.e., zirconium carboxyethyl acrylate), 2-sulfoalkyl (meth) acrylate, phosphonoalkyl (meth)acrylate, phosphoric acid 2-hydroxyethyl methacrylate ester.

Some of the more common polyanionic polymers used for layer-by-layer coating are: poly(vinyl sulfate), poly(vinyl sulfonate), poly(acrylic acid) (PAA), poly(methacrylic acid), poly(styrene sulfonate), dextran sulfate, heparin, hyaluronic acid, carrageenan, carboxymethylcellulose, alginate, sulfonated tetrafluoroethylene based fluoropolymers such as Nafion®), poly(vinylphosphoric acid), poly(vinylphosphonic acid), and combinations thereof including copolymers thereof.

Suitable polyanions may also include polymer latexes, dispersions, or emulsions with negatively charged functional groups on the surface. Such polymers are available, for example, under the Joncryl tradename (BASF, Florham Park, New Jersey), Carboset tradename (Lubrizol Corporation, Wickliffe, Ohio), and Neocryl tradename (DSM Coating Resins, Wilmington, Massachusetts). Suitable anions may also include inorganic nanoparticles (for example, silicon oxide, aluminum oxide, zirconium oxide, titanium dioxide, nano-clay) suitably above their native isoelectric point, or alternatively surface-modified with negatively charged functional groups.

The light absorbing second material may include a plurality of light absorbing particles, for instance, one or more of a dye, a pigment, and a carbon black. A preferred light absorbing material is carbon black, covalently surface-modified with sulfonate or carboxylate groups, or oxidized to generate carboxy late groups on the surface, for example. Such carbon black materials are available from vendors such as Cabot Corporation (Boston, Massachusetts) and Orient Corporation of America (Cranford, New Jersey).

The layer-by-layer deposition process involves exposing the substrate having a surface charge, to a series of liquid solutions, or baths. This can be accomplished by immersion of the substrate into liquid baths (also referred to as dip coating), spraying, spin coating, roll coating, inkjet printing, and the like. Exposure to the first polyion (e.g. polyelectrolyte bath) liquid solution, which has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. The substrate is then removed from the first polyion liquid solution and is then exposed to a series of rinse baths to remove any physically entangled or loosely bound polyelectrolyte. In some aspects, the rinsing may include rinsing with water. Following these rinse liquid solutions, the substrate is then exposed to a second polyion (e.g. polyelectrolyte or inorganic oxide nanoparticle or carbon black nanoparticle bath) liquid solution, which has charge opposite that of the first polyion liquid solution. Once again adsorption occurs since the surface charge of the substrate is opposite that of the second liquid solution. Continued exposure to the second polyion liquid solution then results in a reversal of the surface charge of the substrate. A subsequent rinsing can be performed to complete the cycle. This sequence of steps is said to build up one layer pair, also referred to herein as a "bi-layer" of deposition and can be repeated as desired to add further layer pairs to the substrate.

Some examples of suitable process for layer-by-layer self-assembled coatings include those described in U.S. Pat. No. 8,234,998 (Krogman et al.) as well as Krogman et al. Automated Process for Improved Uniformity and Versatility of Layer-by-Layer Deposition, Langmuir 2007, 23, 3137-3141.

The thickness of a bi-layer and the number of bi-layers may be selected to achieve the desired light absorption. In some embodiments, the thickness of a bi-layer and the number of bi-layers may be selected to achieve the desired light absorption using the minimum total thickness of self-assembled layers and/or the minimum number of layer-by-layer deposition steps. The thickness of each bi-layer may range from about 5 nm to 350 nm. The number of bi-layers may be at least 5, 6, 7, 8, 9, or 10. In some other aspects, the plurality of coatings may include at least 4, or 10, or 20, or 30, or 40, or 50, or 60 coatings.

Drying the plurality of coatings on the major surface (12) results in a light absorbing layer (20) having an average thickness of greater than about 0.5 microns. In some instances, the average thickness may be greater than 0.75 microns, or 1 micron, or 1.25 microns, or 1.5 microns, or 2 microns, or 2.5 microns, or 3 microns. An optical density of the resulting light absorbing layer (20) may be greater than about 3, or 3.5, or 4, or 4.5, or 5, or 5.5, or 6, or 6.5, or 7, or 7.5, or 8, or 8.5, or 9. The drying of the plurality of coatings on third major surface (12) may include drying each of the coating layers in the plurality of coatings after each of the alternating coatings. When the light absorbing layer (20) is made through the layer-by-layer (LbL) assembly process, UV curing is typically not used. At the same time, various modes of covalent crosslinking may optionally be used. Examples of materials and methods for covalently crosslinking LbL coatings are provided, for example, in U.S. Pat. No. 9,393,589 (Olmeijer) and Rydzek et al. Soft Matter, 2012, Vol. 8., p. 9738-9755.

In some cases, an average dry thickness of each pair of adjacent dried coatings may be between about 10 nm and about 100 nm, or between about 20 nm and about 90 nm, or between about 30 nm and about 90 nm, or between about 40 nm and about 90 nm, or between about 40 nm and about 80 nm, or between about 50 nm and about 70 nm.

The aqueous dispersions may include a mixture of water and one or more water-soluble organic cosolvent(s), in amounts such that the aqueous liquid medium forms a single phase. In some aspects, at least one of the aqueous dispersions in the plurality of aqueous dispersions of the first polymeric material and the plurality of aqueous dispersions of the light absorbing second material may include at least one or more of water-soluble organic cosolvents. Examples of water-soluble organic cosolvents include methanol, ethanol, isopropanol, 2-methoxyethanol, 3-methoxypropanol, 1-methoxy-2-propanol, tetrahydrofuran, and ketone or ester solvents. The amount of organic cosolvent typically does not exceed 15 wt-% of the total liquids of the coating composition. The aqueous polyelectrolyte composition for use in layer-by-layer self-assembly typically comprises at least 0.01 wt-%, 0.05 wt-% or 0.1 wt-% of polyelectrolyte and typically no greater than 5 wt-%, 4 wt-%, 3 wt-%, 2 wt-% or 1 wt-%.

In some embodiments, the plurality of aqueous dispersions may further include a "screening agent", an additive that promotes even and reproducible deposition by increasing ionic strength and reducing interparticle electrostatic repulsion. Suitable screening agents include any low molecular weight salts such as halide salts, sulfate salts, nitrate salts, phosphate salts, fluorophosphate salts, and the like. In some embodiments, the aqueous dispersions may include a screening agent (e.g. NaCl) at a concentration ranging from 0.01 M to 0.1M. The absorptive regions may contain trace amounts of screening agent.

A plurality of through physical openings (30) are formed in the light absorbing layer extending between opposite major surfaces of the light absorbing layer (20). For instance, the plurality of through physical openings (30) may be formed in the light absorbing layer by one or more of a laser ablation process, an ion beam assisted etching process, a wet chemical etching process, a plasma etching process, a reactive ion etching process, and a photolithographic patterning process.

The present description should not be considered limited to the particular examples described herein, but rather should be understood to cover all aspects of the description as fairly set out in the attached claims. Various modifications, equivalent processes, as well as numerous structures to which the present description can be applicable will be readily apparent to those of skill in the art to which the present description is directed upon review of the instant specification. The foregoing description can be better understood by the following examples.

EXAMPLES

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Co., St. Louis, Missouri.

The components of the cast-and-cure microreplication resin (see Preparative Example 1) are similar to examples in U.S. Pat. No. 9,360,591. The raw materials for the layer-by-layer coating are listed in Table 1 below.

TABLE 1

| Raw materials for the layer-by-layer coatings | | |
|---|---|---|
| Material | Abbreviation | Source |
| Sancure ® 20072 cationic polyurethane dispersion | SC20072 | Lubrizol (Cleveland, Ohio) |
| Anionic, surface-modified carbon black | EXPCB | Cabot Corporation (Boston, Massachusetts) |
| Sodium chloride | NaCl | Sigma-Aldrich Co. (St. Louis, Missouri) |
| Pluronic L92 | PL92 | BASF (Florham Park, New Jersey) |

Preparative Example 1 (PE1): Preparation of Microlens Film

The microlens designs are:

Close hex-pack pillar microlenslet structures (See FIG. 2A)

Radius of curvature of the microlenslet is 16.5 um

Cross-web machine pitch is 20 um and Down-web machine pitch is 17.3 um

Microlens height is 4.5 um

Figure 2B:
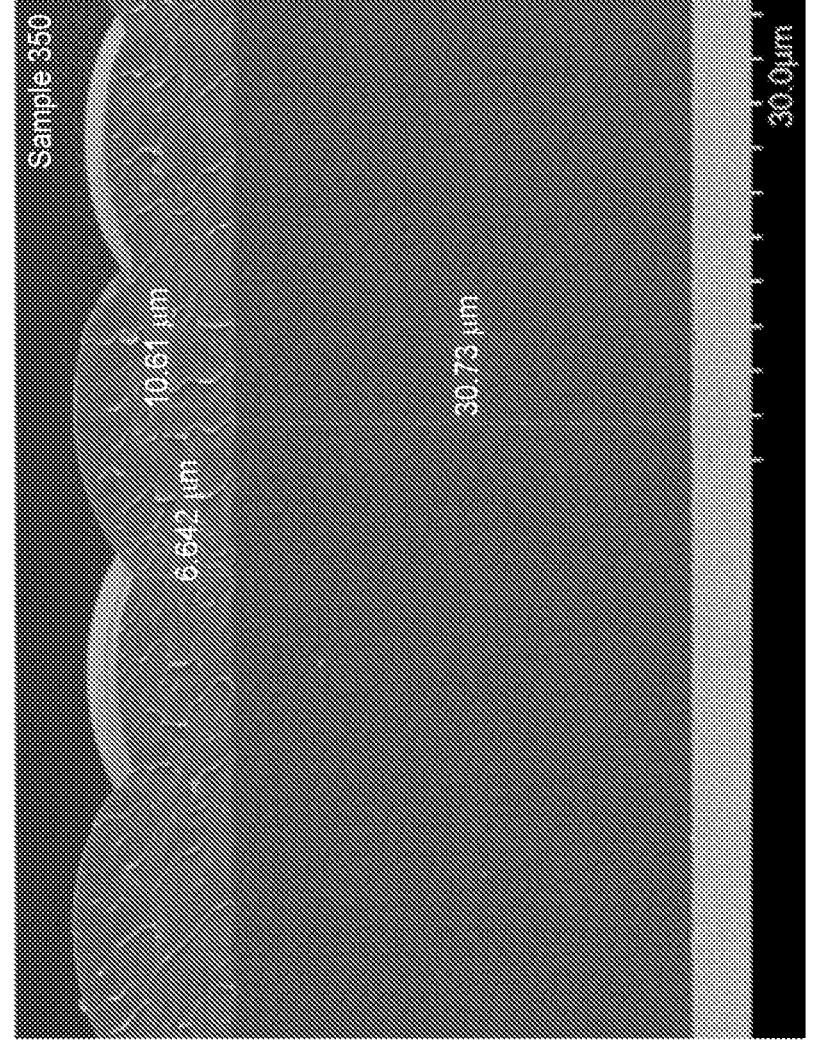

Diamond Turning Machine (DTM) process with Ultra-Fast Tune Servo (UFTS) are used to fabricate the microlenslet structures on a metal tooling drum. The microlens tooling drum is then microreplicated on PET substrate with high index resin by Continuous Cast and Cure (3C) process. Table 1 shows microreplication resin formulation. The refractive index of microreplication resin with at 633 nm (red) measures 1.67, at 532 nm (green) measures 1.68 and at 404 nm (blue) measures 1.71. The land thickness is precisely control by 3C process for optimal focal length distance for laser ablation process. FIGS. 2A and 2B show the top down view and the cross section, respectively, of the microlenslet structures on PET substrate and land thickness.

Preparative Example 2 (PE2): Preparation of LbL Coating Solutions

SC72 coating solution was made by diluting Sancure 20072 from 27 wt % solids to 1 wt % solids with DI water and adding NaCl to a concentration of 200 mM. EXPCB coating solution was made by diluting EXPCB from 30 wt % to 1.0 wt % with DI water. NaCl was added to a concentration of 50 mM. PL92 was added to each coating solution at a concentration of 0.1 wt %. Note that NaCl was pre-dissolved in the water prior to adding the SC72 or EXPCB.

Method for Making Layer-by-Layer Self-Assembled Coatings

Layer-by-layer self-assembled coatings were made using an apparatus purchased from Svaya Nanotechnologies, Inc. (Sunnyvale, CA) and modeled after the system described in U.S. Pat. No. 8,234,998 (Krogman et al.) as well as Krogman et al. Automated Process for Improved Uniformity and Versatility of Layer-by-Layer Deposition, Langmuir 2007, 23, 3137-3141. The apparatus comprises pressure vessels loaded with the coating solutions. Spray nozzles with a flat spray pattern (from Spraying Systems, Inc., Wheaton, Illinois) were mounted to spray the coating solutions and rinse water at specified times, controlled by solenoid valves. The pressure vessels (Alloy Products Corp., Waukesha, WI) containing the coating solutions were pressurized with nitrogen to 30 psi, while the pressure vessel containing deionized (DI) water was pressurized with air to 30 psi. Flow rates from the coating solution nozzles were each 10 gallons per hour, while flow rate from the DI water rinse nozzles were 40 gallons per hour. The substrate to be coated (9"×10") was adhered at the edges with epoxy (Scotch-Weld epoxy adhesive, DP100 Clear, 3M Company, St. Paul, MN) to a glass plate (12"×12"×⅛" thick) (Brin Northwestern Glass Co., Minneapolis, MN), which was mounted on a vertical translation stage and held in place with a vacuum chuck. In a typical coating sequence, the polycation (e.g., PDAC) solution was sprayed onto the substrate while the stage moved vertically downward at 76 mm/sec. Next, after a dwell time of 12 sec, the DI water was sprayed onto the substrate while the stage moved vertically upward at 102 mm/sec. The substrate was then dried with an airknife at a speed of 3 mm/sec. Next, the polyanion (e.g., carbon black nanoparticles) solution was sprayed onto the substrate while the stage moved vertically downward at 76 mm/sec. Another dwell period of 12 sec was allowed to elapse. The DI water was sprayed onto the substrate while the stage moved vertically upward at 102 mm/sec. Finally, the substrate was then dried with an airknife at a speed of 3 mm/sec. The above sequence was repeated to deposit a number of "bi-layers" denoted as (Polycation/Polyanion)$_n$, where n is the number of bi-layers. The coated substrate (e.g. polymer film) was stripped off of the glass prior to subsequent processing. The coating on the glass was retained for thickness, light transmission, and surface resistivity measurements.

Method for Laser Ablation

Laser ablation through the microlens layer was used to define the pinhole array in the light blocking layer. A 40 W pulsed fiber laser (SPI Lasers, UK) operating at a wavelength of 1070 nm was used in the experiments. An intense and high quality beam was generated by the laser. The fiber laser was protected from back reflection with a Faraday isolator mounted at the end of the beam delivery fiber. The laser beam diameter after passing through a beam expander was approximately 10 mm.

The beam was directed to a commercially available laser scanner head (hurrySCAN III 14) acquired from SCANLAB AG (Germany) with a dielectric mirror. After being reflected down by a pair of galvo-mirrors the beam was finally focused by an F-Theta tele-centric focusing lens. A 167 mm focal length focusing lens was used in the ablation experiments. The scanner was mounted to a manual Z-stage to control position in the Z direction. Average laser power was kept between 2-3 W (15%). Pulse duration was set to 200 ns.

Method for Measuring the Visible Light Transmission and Optical Density of a Coating on Glass Visible light transmission (% T) was measured with a BYK (Geretsried, Germany) HazeGard i instrument. Optical density (OD) was calculated as OD=2−log (% T).

Method for Measuring Thickness of a Coating on Glass

Thickness was measured with a Dektak XT stylus profilometer (Bruker Nano Inc., Tucson, Arizona) after scoring the coating with a razor blade Method for Determining Weight Percent of Carbon Black in the Coatings Coatings on glass were scraped off with a razor blade. The samples were analyzed using the TA Instruments Discovery Thermogravimetric Analyzer (TGA) in HiRes mode. Each sample was subjected to a heating profile ranging from room temperature (~35° C.) to 700° C. in a nitrogen atmosphere, with a linear heating rate of 20.0° C./min and a resolution setting of 4.0. Under these conditions, the instrument heats the sample until weight loss is detected, at which point the temperature stabilizes until weight loss diminishes, and then heating recommences. At 700° C. the atmosphere was then switched to air and the HiRes heating ramp was continued to 800° C. Weight percent carbon black was calculated by subtracting the weight % residue in air at 800° C. from the weight % residue in nitrogen at 700° C.

Method for Determining the Optical Extinction Coefficient

The optical extinction coefficient, k of a thin film coating is commonly determined by either ellipsometry or UV/VIS spectroscopy. The extinction coefficient, k, is defined as $\alpha\lambda/(4\pi)$ where $\alpha$ is the absorption coefficient and $\lambda$ is wavelength. For a thin film coating on a transparent substrate, one can use UV/VIS spectroscopy to measure the absorptance (A) as 1–T–R, where T is transmittance and R is reflectance. The measured A must be appropriately corrected for the A of the substrate to obtain A of the thin film itself. A is then converted to $\alpha$ by the equation $\alpha=-\ln[(100-A)/100]/h$ where h is the thickness of the thin film coating; this equation for $\alpha$ is an approximation used when R is relatively small and A is relatively large. Thickness can be measured, for example, by stylus profilometry or cross-sectional scanning electron microscopy.

Method for Scanning Electron Microscopy (SEM) for Cross-Section Data

The sample was sputter coated with Gold/Palladium using a Denton Vacuum DESK II (Moorestown, NJ). This is needed to dissipate electric field buildup in the SEM/FIB, settings were 35 milliamps RF power for 30 seconds using an Argon atmosphere at 150 millitorr The cross-section SEM images were generated using a DualBeam focused ion beam microscope (Helios PFIB, ThermoFisher scientific, Hillsboro Oregon). The sample was placed perpendicular to the ion beam axis. Typical milling conditions to generate a cross section was 1 nano amp current, 1.00 us dwell time using the "cleaning cross-section" mode in the microscope software. The section was milled to a sufficient depth to expose the area of interest.

The face of the cross-section was imaged using the in-built Scanning Electron beam in the microscope. The electron beam "views" the cross-section face at a 52 deg angle. The image is then mathematically corrected for the viewing angle (this is a normal software feature of this and other dualbeam focused ion beams). The resulting SEM image is an accurate representation of the cross-section. Typical SEM imaging conditions were 5 Kv and 86 pA beam current.

Method for Measuring Angular Light Transmission Profile

Angular light transmission through the pinholes was measured on some of the laser ablated samples. The microlens sample was measured on a customized goniometer system, consisting of a collimated light source and a silicon detector. The light source was a green LED with 530 nm emission wavelength attached to a collimation lens, both from Thorlabs. The light source was stationary and has a fixed illumination angle. The silicon detector had a light-sensitive area of 20 mm×20 mm, also purchased from Thorlabs. After the microlens sample was clamped to the silicon detector, it was rotated with the silicon detector along two orthogonal axis, and the angular transmission of the sample was calculated based on the measured power transmission. Typically, two 1-dimensional scans are performed on a sample, one at transverse direction (Cross Web for the film) and the other at longitudinal direction (Down Web for the film). Max measured % T is reported for a single location on a sample. Full width at half maximum (FWHM) is calculated using linear interpolation from the same angular transmission curve used for the max measured % T value. Likewise, peak cross-talk % T is pulled from the same angular transmission curve. Cross-talk occurs when light incident on a certain microlens transmits through a pinhole not opposite that same microlens, but rather opposite an adjacent microlens.

Method for Measuring Surface Roughness of the Light-Absorbing Layer

Height maps were obtained using confocal scanning laser microscopy (CSLM) (VK-X200 from Keyence Corporation of America, Itasca, Illinois). Measurement settings were real peak detection (RPD) set to "on", surface profile mode, plane area, 150× objective, and 1.0× optical zoom. A band pass Fourier spatial filter was applied to the height maps with high pass spatial frequency cutoff of 50 mm$^{-1}$ and low pass spatial frequency cutoff of 1800 mm$^{-1}$ to remove waviness and noise, respectively. Root mean square height, $S_q$, and arithmetical mean height, $S_a$, and $S_z$, were calculated, and reported in regions without holes. Sa and Sq were calculated according to the relationships in the Keyence VK-X100K/X200K manual and ISO 25178. Sz was calculated by taking the difference between the mean height of the 10 highest points where no two points are within the same 11×11 region and the mean height of the ten lowest points where not two points are within the same 11×11 region. A MATLAB (Mathworks, Inc., Natick, Massachusetts) code was used to identify the hole regions and to measure the mean heights, $S_a$ and $S_q$ in the two annular regions about each hole. Holes with annular regions touching the borders were ignored. The inner diameter (IDa) of the inner annular region is slightly larger than the outer diameter (OD) of the holes to avoid height variation from the hole walls. The inner diameter of the second annular region (IDb) is equal to the outer diameter of the inner annual region (ODa). The widths of the inner and outer annual regions are 3 microns.

Example 1

A sheet of microlens film made in PE1 was cut to a size of 9"×10" and corona treated by hand on the planar side using a BD-20AC Laboratory Corona Treater (Electro-Technic Products, Chicago, IL) to prevent the aqueous coating solutions from beading up and dewetting. SC72 and EXPCB coating solutions were made as described in PE2. The film was coated with (SC72/EXPCB)$_{36}$ (i.e., 36 bilayers) using the "Method for Making Spray Layer-by-Layer Self-Assembled Coatings on Microstructured Film". The coating (measured on glass) had a thickness of 2.3 microns determined using the "Method for Measuring Thickness of a Coating on Glass" described above. The optical density (OD) could not be measured directly using the "Method for Measuring the Visible Light Transmission and Optical Density of a Coating on Glass" due to the very high OD. We have found that OD increases linearly with number of bilayers; thus, by extrapolation from thinner coatings, the light absorbing coating of this Example would have OD of 9.2. The coating had a root mean square height, $S_q$, of 157 nm, Sz of 1850 nm and an arithmetical mean height, $S_a$, of 126 nm, as determined using the "Method for Measuring Surface Roughness of the Light-Absorbing Layer" described above. The weight percent of carbon black was determined to be 81.9 wt % using the "Method for Determining Weight Percent of Carbon Black in the Coatings" described above. The coated sheet of microlens film was laser ablated using the "Method for Laser Ablation" above. Optical performance was determined via the "Method for Measuring Angular Light Transmission Profile". Angular transmission curve profiles are shown in FIG. 7. The difference in the root mean square heights, $S_q$, and the arithmetical mean heights, $S_a$, between the inner and outer annular regions of the holes was determined using the "Method for Measuring Surface Roughness of the Light-Absorbing Layer"; these differences we label delta Sa (measuring 0.009±0.004 μm), and delta Sq (measuring 0.015±0.005 μm) respectively where the error bars represent 95% confident interval for the mean.

The invention claimed is:

1. An optical construction comprising:
a lens film comprising an outermost structured first major surface and an opposing outermost second major surface, the structured first major surface comprising a plurality of microlenses arranged along orthogonal first and second directions; and
a light absorbing layer disposed on the second, opposite the first, major surface of the lens film and having an average thickness of greater than about 0.5 microns and an optical density of greater than about 3 for at least one visible wavelength in a visible wavelength range extending from about 420 nm to about 680 nm, the light absorbing layer defining a plurality of through physical openings therein extending between opposite third and fourth major surfaces of the light absorbing layer, at least one of the third and fourth major surfaces comprising a plurality of irregular features imparting an average mean square height Sq of greater than about 0.05 microns to the major surface, wherein at least one of the through physical openings comprises opposing first and second sidewalls, the first and second sidewalls being substantially parallel to a thickness direction of the light absorbing layer and being substantially straight in the thickness direction, wherein the first and second sidewalls have respective first and second best linear fits with respective r-squared values R1 and R2 and respective linear slope magnitudes S1 and S2, each of R1 and R2 greater than about 0.8, and S1 and S2 within 30% of each other,
wherein for each of at least some of the through physical openings in the plurality of through physical openings, the at least one of the third and fourth major surfaces that comprises the plurality of irregular features defines inner and outer concentric annular regions that are concentric with the through physical opening and have annular widths that are within about 20% of a diameter of the through physical opening with an inner diameter of the inner annular region being between about 0.1% to about 2% greater than the diameter of the through physical opening, and an inner diameter of the outer annular region being between about 0.1% to about 2% greater than an outer diameter of the inner annular region,
wherein the at least one of the third and fourth major surfaces that comprises the plurality of irregular features has average mean square heights Sq1 and Sq2 in the respective inner and outer annular region, Sq1–Sq2≤70 nm, and wherein the at least one of the third and fourth major surfaces that comprises the plurality of irregular features has arithmetical mean heights Sa1 and Sa2 in the respective inner and outer annular region, Sa1–Sa2≤50 nm.

2. The optical construction of claim 1, wherein an optical transmittance of the optical construction as a function of an incident angle for a substantially collimated incident light comprises a global transmittance peak greater than about 40% and a corresponding full width at half maximum (FWHM) of less than about 30 degrees.

3. The optical construction of claim 1, wherein the light absorbing layer comprises a plurality of light absorbing particles at a weight loading of greater than about 60%.

4. An optical system configured to sense a presence of a finger of a user of the optical system, the optical system comprising:
the optical construction of claim 1;
a display configured to display an image for viewing by the user and disposed on the outermost structured first major surface side of the lens film; and
an optical sensor configured to detect light reflected by the finger of the user and disposed on the light absorbing side of the optical construction.

5. An optical construction comprising a light absorbing layer having an average thickness of greater than about 1.5 microns, a plurality of light absorbing particles at a weight loading of greater than about 70%, and an optical density of greater than about 3 for at least one visible wavelength in a visible wavelength range extending from about 420 nm to about 680 nm, the light absorbing layer defining a plurality of through physical openings therein extending between opposite major top and bottom surfaces of the light absorbing layer, at least one of the major top and bottom surfaces comprising a plurality of irregular features imparting an average mean square height Sq of greater than about 0.05 microns and an average height Sa of greater than about 0.7 microns to the major surface, such that at least one of the through physical openings comprises opposing first and second sidewalls, the first and second sidewalls being substantially parallel to a thickness direction of the light absorbing layer and being substantially straight in the thickness direction, wherein the first and second sidewalls have having respective first and second best linear fits with respective r-squared values R1 and R2 and respective linear slope magnitudes S1 and S2, each of R1 and R2 greater than about 0.8, and each of S1 and S2 greater than about 4,
wherein for each of at least some of the through physical openings in the plurality of through physical openings, the at least one of the major top and bottom surfaces that comprises the plurality of irregular features defines inner and outer concentric annular regions that are concentric with the through physical opening and have annular widths that are within about 20% of a diameter of the through physical opening with an inner diameter of the inner annular region being between about 0.1% to about 2% greater than the diameter of the through physical opening, and an inner diameter of the outer annular region being between about 0.1% to about 2% greater than an outer diameter of the inner annular region,
wherein the at least one of the major top and bottom surfaces that comprises the plurality of irregular features has average mean square heights Sq1 and Sq2 in the respective inner and outer annular region, Sq1–Sq2≤70 nm.

6. The optical construction of claim 5, wherein the at least one of the major top and bottom surfaces that comprises the plurality of irregular features has arithmetical mean heights Sa1 and Sa2 in the respective inner and outer annular region, Sa1–Sa2≤50 nm.

7. The optical system of claim 4 further comprising a light source configured to emit light, the emitted light reflected by the finger of the user, the optical sensor detecting the reflected light.

* * * * *